US012743172B2

(12) United States Patent
Jang et al.

(10) Patent No.: US 12,743,172 B2
(45) Date of Patent: Sep. 22, 2026

(54) INPUT SENSING DEVICE AND DRIVING METHOD THEREOF, DISPLAY DEVICE INCLUDING INPUT SENSING DEVICE

(71) Applicant: LG Display Co., Ltd., Seoul (KR)

(72) Inventors: Hyunwoo Jang, Gyeonggi-do (KR); Jaekyu Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/222,271

(22) Filed: May 29, 2025

(65) Prior Publication Data

US 2026/0133655 A1 May 14, 2026

(30) Foreign Application Priority Data

Nov. 14, 2024 (KR) ........................ 10-2024-0162205

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/0443* (2019.05)

(58) Field of Classification Search
CPC ... G06F 3/04166; G06F 3/0443; G06F 3/0412
See application file for complete search history.

(56) References Cited

U.S. PATENT DOCUMENTS

2018/0046325 A1* 2/2018 Kim ...................... G06F 3/0446
2018/0188882 A1* 7/2018 Kang ................. G06F 3/04166
2019/0179484 A1* 6/2019 Jang ...................... G06F 3/0418
2023/0215340 A1* 7/2023 Choi ..................... G06F 3/0412
345/174

FOREIGN PATENT DOCUMENTS

KR 10-2305323 3/2016
KR 10-2618596 4/2018

* cited by examiner

*Primary Examiner* — Kwang-Su Yang
(74) *Attorney, Agent, or Firm* — Fish & Richardson P.C.

(57) ABSTRACT

An input sensing device, including: a touch panel including touch electrodes; a sensing circuit configured to operate in a low power mode in a display driving period in one frame and sense a touch input based on a touch sensing signal output from the touch electrodes in response to a touch driving signal in a touch driving period; a power generator configured to generate the touch driving signal in the touch driving period; and a touch control unit configured to control an operation timing of the sensing circuit and the power generator, a driving method thereof, and a display device including the input sensing device.

13 Claims, 11 Drawing Sheets

FIG. 8

DP
TP
DP
TSYNCN
ECLK
PWM_TX
Counter
Count
Count value =200
logic
Touch Driving Circuit Turn-On(Power-On)
TDS
Tm

INPUT SENSING DEVICE AND DRIVING METHOD THEREOF, DISPLAY DEVICE INCLUDING INPUT SENSING DEVICE

CROSS REFERENCE TO RELATED APPLICATION

Pursuant to 35 U.S.C. § 119 (a), this present application claims the benefit of an earlier filing date and right of priority to Korean Patent Application No. 10-2024-0162205, filed on Nov. 14, 2024, the entire contents of which are incorporated herein by reference.

TECHNICAL FIELD

The present disclosure relates to an input sensing device, a driving method thereof, and a display device including the input sensing device.

BACKGROUND

As information society has developed, various types of display devices have been developed. Recently, various display devices such as a liquid crystal display (LCD), a plasma display panel (PDP), and an organic light emitting display (OLED) have been utilized.

Recently, a display device including a touch screen panel is widely used, which can sense an input of a touch, a hovering, and/or a gesture through a finger of the user or a stylus pen, etc., rather than through conventional input methods such as use of a button, a keyboard, and a mouse.

SUMMARY

According to an aspects of the present disclosure, implementations provide an input sensing device configured to count a stabilization period of the touch driving signal in a first touch driving period, and to control a turn-on timing of the analog circuit based on the count value in a second touch driving period, a method for operating the input sensing device, and a display device including the input sensing device.

One implementation is an input sensing device, including: a touch panel including touch electrodes; a sensing circuit configured to operate in a low power mode in a display driving period in one frame and sense a touch input based on a touch sensing signal output from the touch electrodes in response to a touch driving signal in a touch driving period in the one frame; a power generator configured to generate the touch driving signal in the touch driving period; and a touch control unit configured to control an operation timing of the sensing circuit and the power generator.

In the touch driving period, the sensing circuit may be woken up after a predetermined time margin, which may be a time duration for the touch driving signal to be stabilized.

The touch control unit may be configured to output a touch synchronization signal at a first level in the display driving period, and to output the touch synchronization signal at a second level in the touch driving period, and the power generator may be configured to generate the touch driving signal in response to the touch synchronization signal at the second level.

The sensing circuit may be woken up after the time margin from based on a determination that the touch synchronization signal is transitioned to the second level.

The input sensing device may further include: a counter configured to perform a counting operation in response to the touch synchronization signal at the second level, and output a logic signal having a predetermined level based on a count value reaching a preset count value, and the sensing circuit may be woken up in response to the logic signal.

The counter may be configured to count a quantity of pulses of a clock signal.

The preset count value may be set in correspondence with the time margin.

The counter may be configured to perform the counting operation during the time margin, and based on a determination that the touch synchronization signal is stabilized, to reset the count value as the preset count value.

The counter may be configured to determine that the touch synchronization signal is stabilized based on a rising edge or a falling edge of the touch synchronization signal being detected.

The input sensing device may further include: an analog circuit block including the sensing circuit and configured to generate the touch sensing signal by converting a capacitance signal output from the touch electrodes into a digital signal; and a digital circuit block including the counter and configured to transmit the touch sensing signal to the touch control unit.

Another implementation is a method for operating an input sensing device, the method including: outputting, by the touch control unit, a touch synchronization signal at a first level in the display driving period; transitioning, by the touch control unit, the touch synchronization signal to a second level in the touch driving period; performing, by the counter, a counting operation in response to the transition of the touch synchronization signal; and waking up, by the counter, the sensing circuit based on a count value reaching a preset count value.

The preset count value may be set based on a predetermined time margin for the touch driving signal to be stabilized.

The method for operating an input sensing device may further include: after the transitioning, setting the preset count value as 0 based on a current frame being an initial frame after the transitioning.

The method for operating an input sensing device may further include: after the transitioning, generating, by the power generator, the touch driving signal in response to the transition of the touch synchronization signal; performing, by the counter, the counting operation during a time margin in which the touch driving signal is stabilized; and resetting, by the counter, the count value as the preset count value based on a determination that the touch synchronization signal is stabilized.

The resetting may include: determining that the touch synchronization signal is stabilized based on a rising edge or a falling edge of the touch synchronization signal being detected.

BRIEF DESCRIPTION OF THE DRAWINGS

FIG. 8 is a diagram illustrating input/output signals of an input sensing device illustrated in FIG. 7.

DETAILED DESCRIPTION

Figure 1:
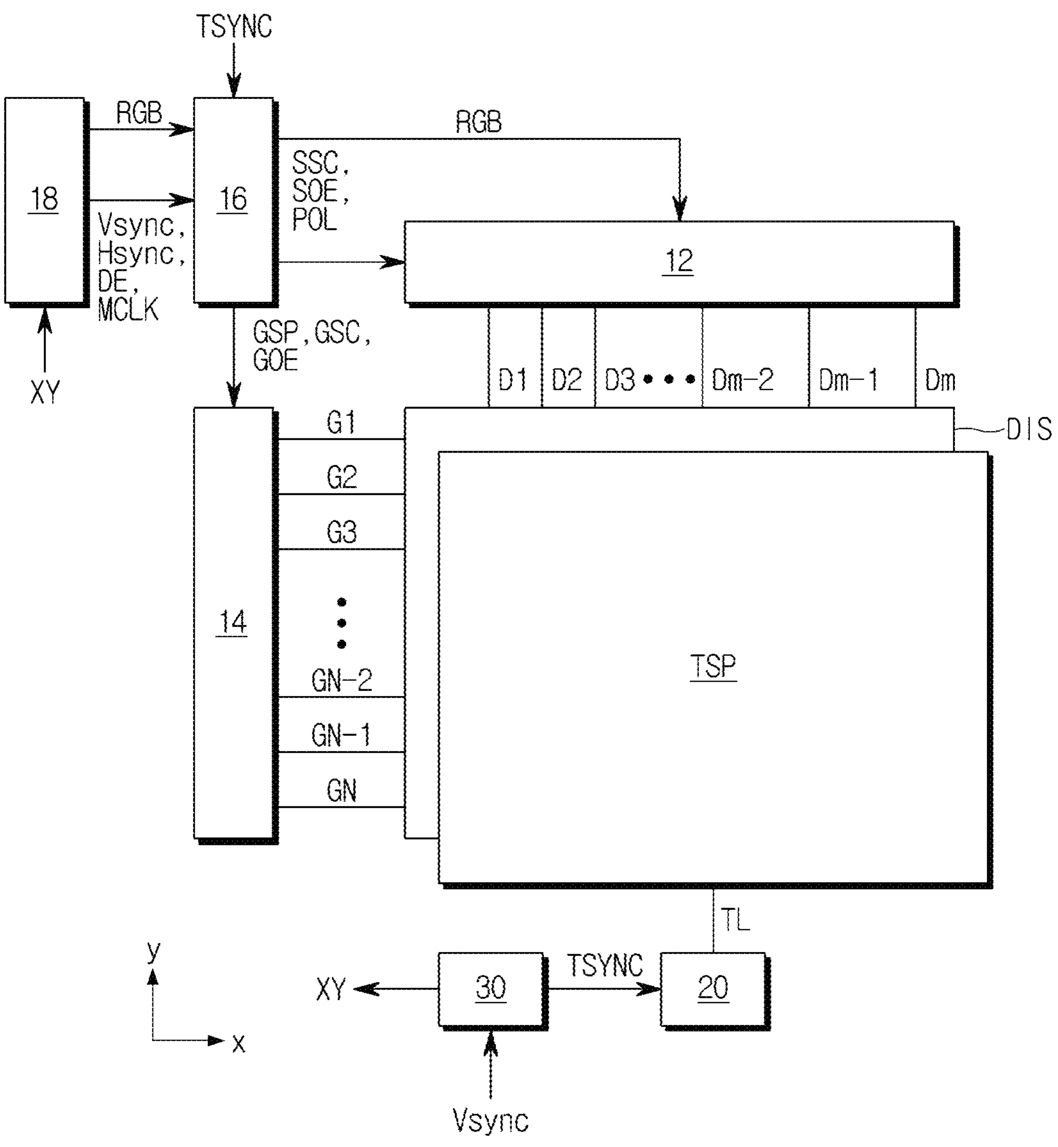
FIG. 1 is a block diagram illustrating a configuration of a display device according to an implementation.

A display device can include an input sensing device for detecting whether there is an input and detecting an input coordinate (e.g., a position of the input). The input sensing device may drive touch electrodes disposed in the touch screen panel, and process a signal output from the touch electrodes through an analog circuit and a digital circuit. The input sensing device may detect whether there is an input and/or detect a position of the input based on the processed touch sensing signal.

Implementations disclosed herein provide an input sensing device including an analog circuit configured to be turned on in a particular period of time (e.g., during a period of time for sensing an input) and turned off in the remaining period of time while the touch sensing is driven. Implementations also provide a method for operating the input sensing device, and a display device including the input sensing device.

Implementations provide an input sensing device including an analog circuit configured to be turned off while the touch driving signal is stabilized after a start of the touch driving period. Implementations also provide a method for operating the input sensing device, and a display device including the input sensing device.

The input sensing device, the method for operating the input sensing device, and the display device including the input sensing device according to the implementations may reduce power consumption by turning off the analog circuit block during a non-touch sensing period.

The input sensing device, the method for operating the input sensing device, and the display device including the input sensing device according to the implementations may prevent unnecessary power consumption by turning off the analog circuit block while the touch driving signal is stabilized in the touch sensing period.

The input sensing device, the method for operating the input sensing device, and the display device including the input sensing device according to the implementations may improve the touch sensing accuracy by performing the touch sensing using a stabilized touch driving signal.

The input sensing device, the method for operating the input sensing device, and the display device including the input sensing device according to the implementations may actively cope with changes of an operation environment by determining (e.g., counting) the stabilization time of the touch driving signal in an actual operation environment, and adaptively varying a turn-off time of the analog circuit block.

Hereinafter, implementations of the disclosure will be described with reference to the drawings. In this specification, when it is mentioned that a component (or, an area, a layer, a part, etc.) is referred to as being "on", "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description. "And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the disclosure. The singular expressions include plural expressions unless the context clearly dictates otherwise.

In addition, terms such as "below", "the lower side", "on", and "the upper side" are used to describe a relationship of configurations shown in the drawing. The terms are described as a relative concept based on a direction shown in the drawing.

In various implementations of the disclosure, the term "include," "comprise," "including," or "comprising," specifies a property, a fixed number, a step, a process, an element and/or a component, or a combination thereof, but does not exclude presence or addition of other properties, fixed numbers, steps, processes, elements and/or components, or a combination thereof.

FIG. 1 is a block diagram illustrating a configuration of a display device according to an implementation.

Referring to FIG. 1, a display device according to an implementation may include a driving circuit and a display panel DIS. The driving circuit is configured to control light emission of pixels disposed in the display panel DIS, and includes a data driving circuit 12, a scan driving circuit 14, and a timing controller 16.

The data driving circuit 12 may generate data voltages by converting digital video data RGB output from the timing controller 16 into analog voltages. The data driving circuit 12 may provide the generated data voltages to pixels of the display panel DIS through a plurality of data lines D1 to Dm. The data driving circuit 12 may be configured in a form of a source driver circuit or a source driver integrated circuit (SDIC).

The scan driving circuit 14 may provide a gate pulse (or a scan pulse) synchronized with the data voltage to gate lines G1 to Gn sequentially. The scan driving circuit 14 may be configured in a form of a gate driver IC (GDIC), and may be integrated into the display panel DIS in a gate-in-panel (GIP) form.

The timing controller 16 controls an operation timing of the data driving circuit 12 and the scan driving circuit 14 based on timing signals such as a vertical synchronization signal Vsync, a horizontal synchronization signal Hsync, a data enable signal DE, and a main clock MCLK input from a host system 18.

The host system 18 may be one among a television system, a set top box, a navigation system, a DVD player, a blue-ray player, a personal computer (PC), a home theater system, and a phone system, but is not limited thereto. The host system 18 includes an SoC (System on chip) embedded with a scaler, and converts digital video data RGB of an input video into a format suitable for display in the display panel DIS. The host system 18 transmits the timing signals (Vsync, Hsync, DE, MCLK) together with digital video data to the timing controller 16. In addition, the host system 18 may implement an application program related with coordinate information XY input from a touch driving circuit 20 which will be described below.

The timing controller 16 generates a data timing control signal based on the timing signal and applies the signal to the data driving circuit 12. The data timing control signal includes a source sampling clock SSC, a polarity control signal POL, a source output enable signal SOE, and the like.

The timing controller 16 generates a scan timing control signal based on the timing signal and applies the signal to the scan driving circuit 14. The scan timing control signal includes a gate start pulse GSP, a gate shift clock GSC, a gate output enable signal GOE and the like.

In the display panel DIS, a plurality of pixels (or, referred to as sub-pixels) are disposed. For example, the pixels may be disposed in a matrix form in the display panel DIS. The pixels PX disposed in one pixel row are connected to the same gate line (G1 to Gn), and the pixels PX disposed in one column are connected to the same data line (D1 to Dm). The pixels PX may emit light at luminance corresponding to the gate pulse and a data voltage supplied through the gate lines (G1 to Gn) and the data lines (D1 to Dm).

In an implementation, each pixel PX may display one color among red, green, and blue. In another implementation, each pixel PX may display one color among cyan, magenta and yellow. In various implementations, each pixel PX may display one color among red, green, blue and white.

The pixels may include a thin film transistor which is formed in a region where one gate line G1 to Gn and one data line D1 to Dm intersect, a light emitting diode such as an organic light emitting diode which charges a data voltage, a storage capacitor for maintaining a data voltage during one frame, and the like.

A black matrix, a color filter and the like are formed on an upper substrate of the display panel DIS, and the thin film transistor, the light emitting diode and the like may be formed on a lower substrate of the display panel DIS. The display panel DIS may be implemented in a Color-Filter-On-TFT (COT) structure, and in this case, the color filter and the black matrix may be formed on the lower substrate of the display panel DIS.

In an implementation, the display device may be configured with an input sensing device. The input sensing device may include a touch panel TSP which includes touch electrodes, the sensing driving circuit 20 which determines whether the touch is generated based on a capacitance signal output from the touch electrodes, and a touch control unit 30 which controls an operation timing of the touch driving circuit 20.

The touch panel TSP may be disposed by overlapping the display panel DIS, and may be configured as an external type (an Add-On type) attached to an upper portion of the display panel DIS, or as an embedded type (an In-Cell type or an On-Cell type) disposed between layers of the display panel DIS.

The touch panel TSP includes touch electrodes, and includes touch lines TL connected to the touch electrodes. The touch electrodes may be electrically connected to the touch driving circuit 20 through the touch lines TL. Each of the touch electrodes may receive a touch driving signal through the corresponding touch line TL, and output a capacitance signal which corresponds to the capacitance change to the touch driving circuit 20 in response to the touch driving signal.

The touch driving circuit 20 may be configured in a Read-Out IC (ROIC) form. The touch driving circuit 20 may be implemented independently, or may be implemented as one or more integrated circuit together with the data driving circuit 12. For example, the touch driving circuit 20 and the data driving circuit 12 may be mounted in one IC, for example, the Source-Drive Red-Out IC (SRIC) and the like.

The touch driving circuit 20 may sense a change amount of the capacitance in the touch electrode so as to determine whether input of a conductive material such as a finger occurs and where the input thereof occurs. The touch driving circuit 20 may apply the touch driving signal to the touch electrode, and may receive a capacitance signal output from the touch lines TL.

The touch driving circuit 20 determines that an input occurs when the change amount of the capacitance of the touch electrode is greater than a threshold value by using the capacitance signal, and transmits a touch sensing signal with respect to generation of a touch and a position of the touch to the touch control unit 30.

The touch control unit 30 may be configured in a micro-control unit (MCU) form. The touch control unit 30 may be implemented independently, or may be configured in a form of one integrated circuit together with the timing controller 16 and the like.

The touch control unit 30 may receive the timing control signal, for example, a vertical synchronization signal Vsync from the timing controller 16, and may generate a touch synchronization signal TSYNC for controlling the touch driving circuit 20 based on the timing control signal. The touch control unit 30 may apply the generated touch synchronization signal TSYNC to the timing controller 10 and the touch driving circuit 20. The timing controller 10 may drive one frame as a plurality of display driving period and a touch driving period in the time-division manner based on the touch synchronization signal TSYNC. The touch driving circuit 20 may perform touch sensing during the touch driving period instructed by the touch synchronization signal TSYNC.

The touch control unit 30 may generate sensing data which includes an input coordinate information (XY) and the like based on the touch sensing signal input from the touch driving circuit 20. The touch control unit 30 may transmit the generated sensing data to the host system 18.

In an implementation, the display device may be a rigid display device or a flexible display device. For example, the display device may be a foldable display device, a bendable display device, a rollable display device, a stretchable display device, and the like.

Figure 2:
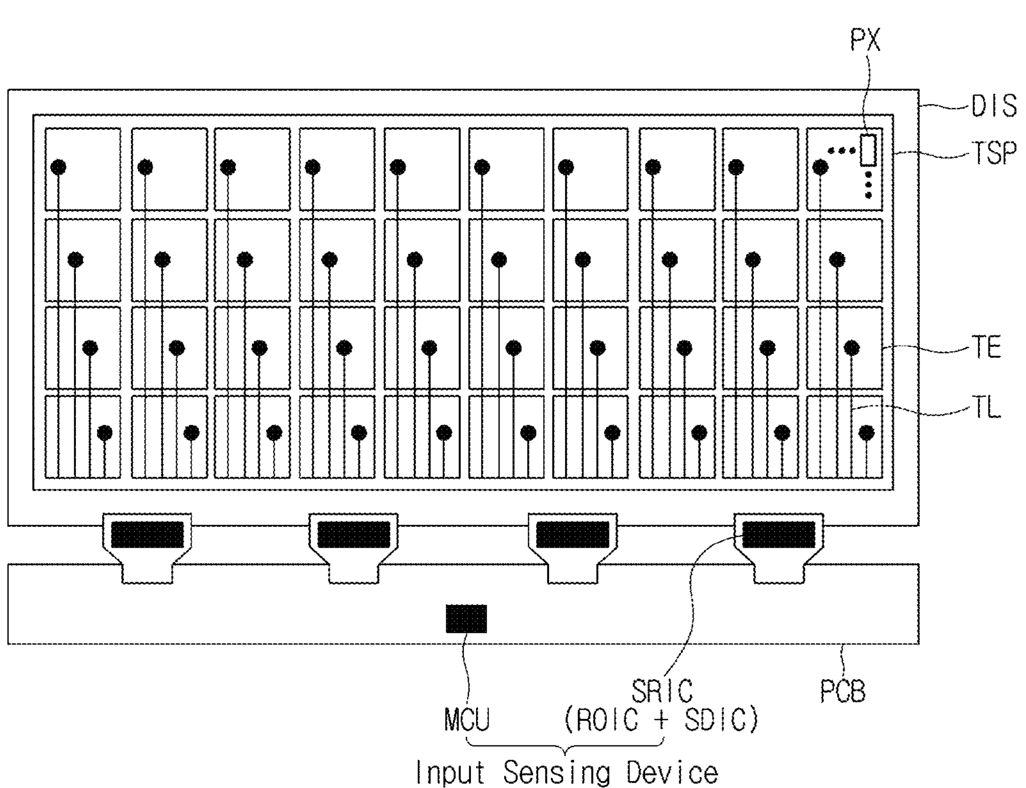
FIG. 2 is a view briefly illustrating a connection relationship between a display panel, a data driving circuit, and an input sensing device according to an implementation.

FIG. 2 is a view briefly illustrating a connection relationship between the display panel, the data driving circuit, and the input sensing device according to an implementation.

In an implementation, the input sensing device may provide a touch sensing function based on a self-capacitance manner in which a touch input is sensed by measuring the capacitance formed in each touch electrode TE or a change of the capacitance. However, the present implementation is not limited thereto. In various other implementations, the touch panel TSP may provide a touch sensing function based on a mutual capacitance manner in which the touch input is sensed by measuring the capacitance formed between two touch electrodes (e.g., a Tx electrode and an Rx electrode) or a change in the capacitance.

The input sensing device may include the touch panel TSP, the touch driving circuit 20, and the touch control unit 30.

In the touch panel TSP, a plurality of touch electrodes TE may be disposed. A size of a region in which one touch electrode TE is formed may correspond to or may be greater than a size of a region in which a pixel PX is formed. For example, one touch electrode TE may be formed such that the one touch electrode TE overlaps two or more pixels PX. However, the present implementation is not limited thereto.

Each of the touch electrodes TE may be electrically connected to the touch driving circuit 20 through one or more touch lines TL. Each of the touch electrodes TE may receive the touch driving signal from the touch driving circuit 20, and may output an electrical signal, for example, a capacitance signal, in response to the touch driving signal.

The touch driving circuit 20 may be electrically connected to the touch electrodes TE through the touch line TL. The touch driving circuit 20 drives the touch electrodes TE, and receives the capacitance signal from the touch electrodes TE. The touch control unit 30 may generate sensing data based on the capacitance signal received from the touch panel TSP.

The touch driving circuit 20 may be implemented as an integrated driving circuit SRIC together with the source drive IC (SDIC) which drives the data lines. The integrated driving circuit SRIC may be a Chip-On-Film (COF) type in which the circuit is mounted to the film.

The film to which the integrated driving circuit SRIC is mounted may be combined with a bonding portion of the display panel DIS and a bonding portion of the printed circuit board PCB, respectively. The touch control unit 30 may be implemented as a micro-control unit (MCU) and may be mounted to the printed circuit board PCB.

Figure 3:
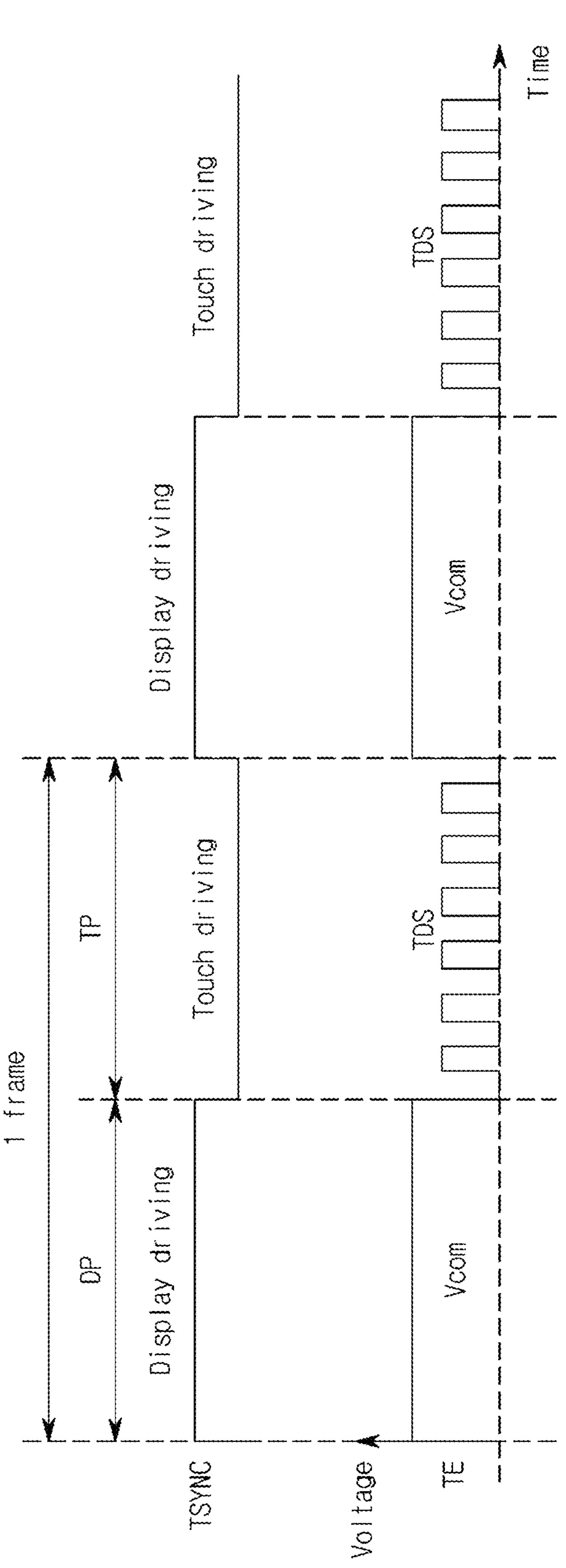
FIG. 3 is a view illustrating a driving signal of an input sensing device illustrated in FIG. 2.

FIG. 3 is a view illustrating an example of a driving signal of the input sensing device illustrated in FIG. 2.

Referring to FIG. 3, one frame for driving the display device according to an implementation may include the display driving period and the touch driving period. The display driving period and the touch driving period may be time-divided within one frame based on the touch synchronization signal TSYNC. For example, a first-level period, for example, a high-level period of the touch synchronization signal TSYNC may be defined as the display driving period, and a second-level period, for example, a low-level period of the touch synchronization signal TSYNC may be defined as the touch driving period.

Referring to FIGS. 2 and 3 together, in the display driving period, a data voltage is applied to the pixels PX of the display panel DIS, and the pixels PX displays an image by emitting light at luminance corresponding to the data voltage. During the display driving period, the input sensing device may stably apply a common voltage Vcom to all the touch electrodes TS through all the touch lines TL, thereby preventing an electrical interference with respect to the pixel PX.

After the display driving period, in the touch driving period, the input sensing device applies a touch driving signal TDS to the touch electrodes TE through the touch lines TL. As illustrated, the touch driving signal TDS may be a pulse signal in the shape of a square wave, but is not limited thereto, and may be a signal in various shapes such as, a sine wave, a triangle wave, and the like.

In the touch driving period, the pixels PX may emit light at luminance which is set in the display driving period, or may be driven in a pixel sensing mode. For example, in the touch driving period, characteristics of the circuit element configuring the pixels PX, for example, a threshold voltage of the driving transistor, mobility, and a threshold voltage of the light emitting diode etc. may be sensed.

The input sensing device may be connected to the touch electrode TE through the touch line TL, and may be configured to selectively apply one among a common voltage Vcom or a touch driving signal TDS to the touch electrode TE.

Figure 4:
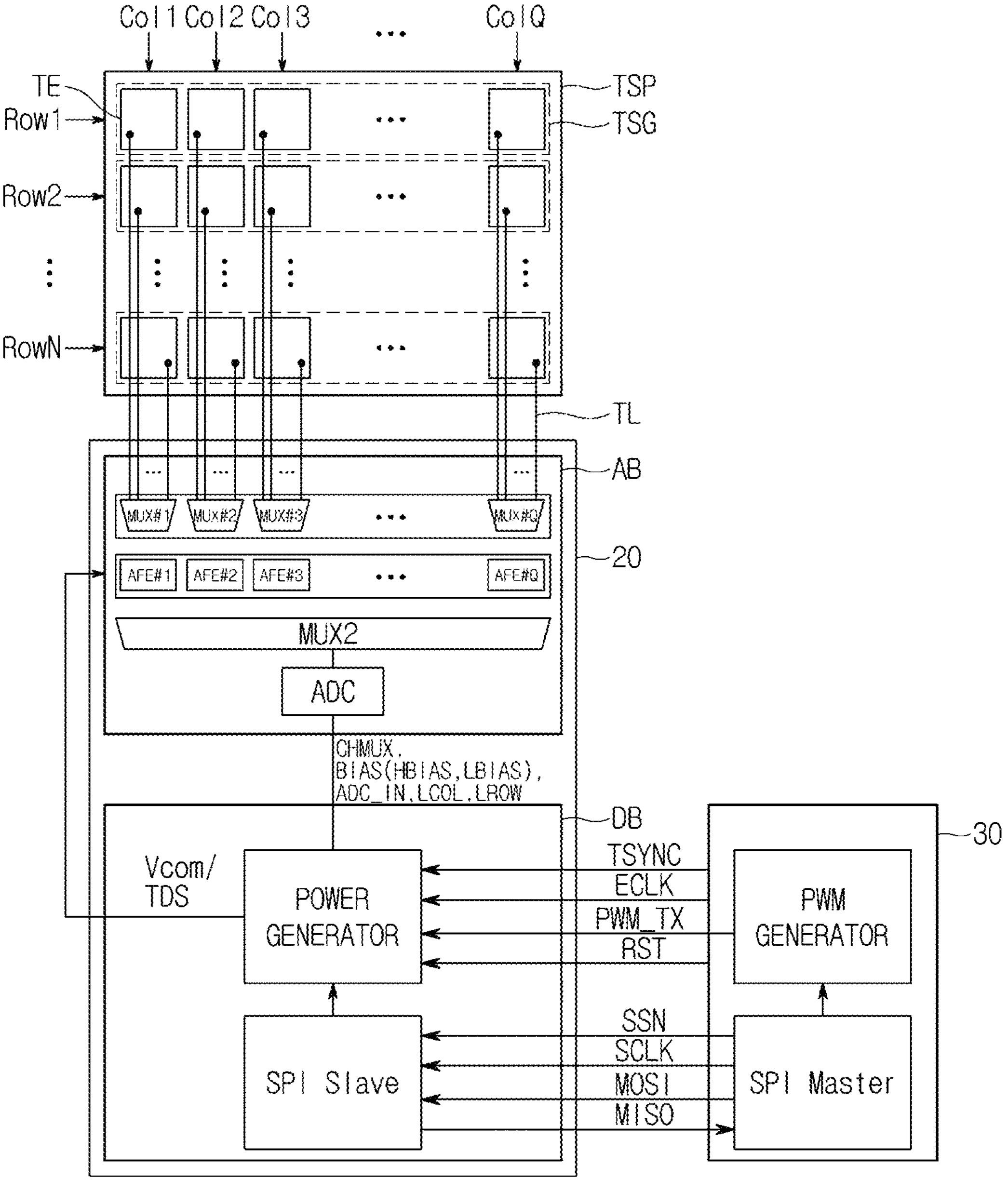
FIG. 4 is a block diagram illustrating a configuration of an input sensing device according to an implementation.

FIG. 4 is a block diagram illustrating a configuration of the input sensing device according to an implementation.

Referring to FIG. 4, the input sensing device may include the touch panel TSP, the touch driving circuit 20, and the touch control unit 30.

The touch panel TSP may include a plurality of touch electrodes TE disposed in n touch electrode rows Row1 to RowN, and q touch electrode columns Col1 to ColQ. Here, n may be a natural number equal to or greater than 2, and q may be a natural number equal to or greater than 1.

The touch driving circuit 20 may be electrically connected to the touch electrodes TE through the touch line TL. The touch driving circuit 20 may drive and sense the touch electrodes TE.

The touch driving circuit 20 may drive and sense the touch electrodes TE on a unit of a touch sensing group TSG. One touch sensing group TSG may consist of, for example, one or two or more touch electrode rows Row1 to RowN, one or two or more touch electrode columns Col1 to ColQ, or the touch electrodes TE disposed in a polygonal shape such as a quadrangle, a rectangle, and the like. However, the implementation is not limited thereto.

The touch driving circuit 20 may sense sequentially or non-sequentially the touch sensing groups TSG while the touch sensing is driven. For example, the touch driving circuit 20 may sense one touch sensing group TSG at a time, or two or more touch sensing groups TSG at the same time.

Hereinafter, an example in which one touch electrode row Row1 to RowN configure one touch sensing group TSG is described. In the implementations below, the input sensing device drives and senses one touch sensing group TSG, that is, q touch electrodes TE included in one touch sensing group, at the same time. In addition, the input sensing device drives, and senses the touch sensing groups TSG, that is, n touch electrode rows Row1 to RowN sequentially, thereby completing sensing with respect to the entire touch sensing groups TSG. However, the implementation is not limited thereto.

In an implementation, the touch driving circuit 20 may include an analog circuit block (AB) and a digital circuit block (DB). The analog circuit block (AB) may perform a front-end processing by receiving a capacitance signal in an analog form output from the touch electrodes TE, and generate a touch sensing signal by converting the capacitance signal into a digital form. The analog circuit block (AB) may be referred to as a sensing circuit. The digital circuit block DB may perform a rear-end processing with respect to a touch sensing signal in a digital form and may output the touch sensing signal to the touch control unit 30 in synchronization with an operation timing of the input sensing device.

The analog circuit block AB may include first multiplexers MUX #1 to MUX #Q, analog front-end circuits AFE #1 to AFE #Q, a second multiplexer MUX2, and an analog-to-digital converter ADC.

The first multiplexers MUX #1 to MUX #Q may be provided in plural number. A quantity of the first multiplexers MUX #1 to MUX #Q may correspond to a quantity of the touch electrodes TE, that is, a quantity of the touch electrodes TE included in one touch sensing group TSG. As illustrated, when one touch sensing group TSG includes q touch electrodes TE included in one touch electrode row, q first multiplexers MUX #1 to MUX #Q may be provided.

The first multiplexers MUX #1 to MUX #Q are connected to the touch electrodes TE through the touch line TL. Each of the first multiplexers MUX #1 to MUX #Q may be connected to the plurality of touch electrodes TE through a plurality of touch lines TL. For example, a first-first multiplexer MUX #1 may be connected to a first touch electrode TE included in the touch sensing group TSG. A second-first multiplexer MUX #2 may may be connected to a second touch electrode TE included in the touch sensing group TSG. However, the implementation is not limited thereto.

Each of the first multiplexers MUX #1 to MUX #Q may be driven in response to a mux control signal CHMUX provided through the digital circuit block DB. Each of the first multiplexers MUX #1 to MUX #Q may electrically connect one among the n touch electrodes TE to a corresponding analog front-end circuit AFE #1 to AFE #Q in response to a mux control signal CHMUX in a turn-on level. Each of the first multiplexers MUX #1 to MUX #Q allows sequential sensing with respect to the touch electrodes TE by sequentially connecting the n touch electrodes TE to the corresponding analog front-end circuit AFE #1 to AFE #Q in the touch driving period.

The analog front-end circuit AFE #1 to AFE #Q may be provided in plural number in correspondence with one or more touch sensing group TSG. The analog front-end circuit AFE #1 to AFE #Q may be selectively connected to the corresponding touch electrodes TE through the corresponding first multiplexer MUX #1 to MUX #Q.

The analog front-end circuit AFE #1 to AFE #Q may be activated (turned on) in response to a bias signal BIAS and a channel selection signal LCOL and LROW provided through the digital circuit block DB. In response to a turn-on level of the bias signal BIAS, a bias voltage for allowing the analog front-end circuit AFE #1 to AFE #Q to operate may be applied to the analog front-end circuit AFE #1 to AFE #Q. The bias signal BIAS may include an n-type control signal for controlling an n-type transistor, and a p-type control signal for controlling a p-type transistor. The n-type control signal may have, for example, a turn-on voltage in a high level and a turn-off voltage in a low level, and may be referred to as a high bias signal HBIAS. The p-type control signal may have, for example, a turn-on voltage in a low level and a turn-off voltage in a high level, and may be referred to as a low bias signal LBIAS.

The channel selection signal LCOL and LROW may instruct a position of the touch electrode TE and/or the touch sensing group TSG subjected to sensing. For example, the channel selection signal LCOL and LROW may be provided in plural number. Each of the channel selection signal LCOL and LROW may correspond to each of the touch electrode rows Row1 to RowN and the touch electrode columns Col1 to ColQ disposed in the touch panel TSP. In response to the channel selection signal LCOL and LROW in a turn-on level, the analog front-end circuits AFE #1 to AFE #Q connected to the corresponding touch electrode row Row1 to RowN and the touch electrode column Col1 to ColQ may be activated.

The activated analog front-end circuits AFE #1 to AFE #Q may amplify and sample the capacitance signal output from the touch electrode TE. The analog front-end circuits AFE #1 to AFE #Q may front-end process the capacitance signal output from the touch electrode TE and output the front-end processed capacitance signal.

The second multiplexer MUX2 may electrically connect one among the analog front-end circuits AFE #1 to AFE #Q to the analog-to-digital converter ADC in response to an ADC input signal ADC_IN provided through the digital circuit block DB. The second multiplexer MUX2 allows a digital conversion with respect to all the capacitance signals by connecting the analog front-end circuits AFE #1 to AFE #Q to the analog-to-digital converter ADC sequentially in the touch driving period.

The analog-to-digital converter ADC may be provided one in number, or in plural. The analog-to-digital converter ADC may be connected to two or more analog front-end circuits AFE. That is, one analog-to-digital converter ADC may be shared between two or more analog front-end circuits AFE.

The analog-to-digital converter ADC may generate the touch sensing signal by converting a signal output sequentially from the analog front-end circuit AFE #1 to AFE #Q into a digital form through the second multiplexer MUX2. The analog-to-digital converter ADC may provide the generated touch sensing signal to the digital circuit block DB.

The digital circuit block DB may include a power generator and a serial peripheral interface (hereinafter, an SPI) slave (SPI Slave).

The power generator may communicate with a PWM generator of the touch control unit 30 through a first interface. The first interface is a different method from a second interface which will be described below, but is not limited particularly.

The power generator may receive a touch synchronization signal TSYNC, and a pulse width modulation signal PWM_TX from the touch control unit 30. The touch synchronization signal TSYNC is a signal which defines the display driving period and the touch driving period of one frame. The power generator may be synchronized with the timing controller 16 (FIG. 1), the data driving circuit 12 and the like based on the touch synchronization signal TSYNC. The pulse width modulation signal PWM_TX is a signal which defines a frequency and a duty ratio (a pulse width) of the touch driving signal TDS (FIG. 3) applied to the touch electrode TE.

The power generator may generate the common voltage Vcom and the touch driving signal TDS by receiving a power received from an external device, and may output the common voltage Vcom and the touch driving signal TDS to the touch electrode TE in synchronization with the touch synchronization signal TSYNC. For example, in the display driving period in which the touch synchronization signal TSYNC is applied in a high level, the power generator may apply the common voltage Vcom to the touch electrodes TE, and in the touch driving period in which the touch synchronization signal TSYNC is applied in a low level, the power generator may apply the touch driving signal TDS to the touch electrodes TE.

In an implementation, the power generator may directly apply the common voltage Vcom or the touch driving signal TDS to the touch panel TSP. Alternatively, as illustrated, the power generator may apply the common voltage Vcom or the touch driving signal TDS to the touch panel TSP through the analog circuit block AB. For example, the power generator may apply the common voltage Vcom or the touch driving signal TDS to the touch panel TSP through the analog front-end circuit AFE #1 to AFE #Q, but is not limited thereto.

The power generator may further receive a first clock signal ECLK for driving the analog circuit block AB from the touch control unit 30, and deliver the first clock signal ECLK to the analog circuit block AB. For example, the power generator may deliver the first clock signal ECLK to the analog front-end circuits AFE #1 to AFE #Q of the analog circuit block AB.

The first clock signal ECLK may control an operation timing of the analog circuit block AB. The first clock signal ECLK may be provided so as to define each of touch sensing periods in the touch driving period, and may be a predetermined square-wave pulse signal. For example, one touch sensing period may be a period between rising edges (or falling edges) of two adjacent pulses. The first clock signal ECLK may be generated in the touch driving period, that is, while the touch synchronization signal TSYNC is applied in a low level, and may be further generated while the touch synchronization signal TSYNC is transitioned into a low level. As the touch driving circuit 20 is driven through an independent first clock signal ECLK, the touch driving circuit 20 may operate independently from the data driving circuit 12. In an implementation, the first clock signal ECLK may be directly applied to the analog circuit block AB from the touch control unit 30.

The power generator may further receive a reset signal RST from the touch control unit 30, and may deliver the reset signal RST to the analog circuit block AB. The power generator may be reset in response to the reset signal RST, and may reset the analog circuit block AB. For example, the power generator may reset the analog circuit block AB by temporarily blocking the power or the bias signal applied from the analog circuit block AB, and resupplying the power or the bias signal.

The SPI slave may bi-directionally communicate with an SPI master of the touch control unit through the second interface, for example, an SPI. The SPI may operate in a full-duplex mode which is a communication method using each independent signal line to allow the touch driving circuit 20 and the touch control unit 30 to receive or send the data (a signal, information).

The SPI slave may receive a slave selection signal SSN and a second clock signal SCLK from the touch control unit 30. The slave selection signal SSN may be applied so as to control an operation mode of the touch driving circuit 20. While the slave selection signal SSN is in a first level, for example, a high level, the touch control unit 30 may operate in a transmission mode, and the SPI slave may operate in a reception mode. While the slave selection signal SSN is in a second level, for example, a low level, the touch control unit 30 may operate in the reception mode, and the SPI slave may operate in the transmission mode. The second clock signal SCLK may be applied so as to synchronize the SPI slave and the touch control unit 30.

While the slave selection signal SSN is in the high level, the SPI slave may receive master data (master output slave input, hereinafter, 'MOSI') applied from the touch control unit 30. While the slave selection signal SSN is in the low level, the SPI slave may transmit slave data (master input slave output, hereinafter 'MISO') to the touch control unit 30 in synchronization with the second clock signal SCLK. For example, the SPI slave may buffer the touch sensing signal input from the analog circuit block AB, and may transmit the touch sensing signal input therefrom to the touch control unit 30 in synchronization with the second clock signal SCLK.

The touch control unit 30 may compare a change amount of the capacitance included in the touch sensing signal with a predetermined threshold value. The touch control unit 30 determines a position of the touch electrodes TE having a change amount of the capacitance equal to or greater than the threshold value as a touch input region. The touch control unit 30 may calculate a coordinate with respect to each of the touch input, and may transmit sensing data Vsen which includes coordinate information and the like to the host system 18 (FIG. 1).

The touch control unit 30 may generate the touch synchronization signal TSYNC, and may apply the touch synchronization signal TSYNC to the touch driving circuit 20. In addition, the touch control unit 30 may further generate the first clock signal ECLK and the reset signal RST, and may apply the signals to the touch driving circuit 20. The touch control unit 30 may apply the generated signals to the power generator inside the digital circuit block DB. Alternatively, the touch control unit 30 may directly apply the generated signals to the analog circuit block AB.

The touch control unit 30 may include the PWM generator (a pulse width modulation generator) and the SPI master.

The PWM generator may generate the pulse width modulation signal PWM_TX using the power received from an external device, and may apply the pulse width modulation signal PWM_TX to the touch driving circuit 20.

The SPI master may bi-directionally communicate with the SPI slave through the SPI. The SPI master may generate the slave selection signal SSN and the second clock signal SCLK, and may apply the slave selection signal SSN and the second clock signal SCLK to the SPI slave.

While the slave selection signal SSN is in a high level, the SPI master may transmit the master data MOSI to the SPI slave in synchronization with the second clock signal SCLK. While the slave selection signal SSN is in a low level, the SPI master may receive the slave data MISO from the SPI slave.

Figure 5:
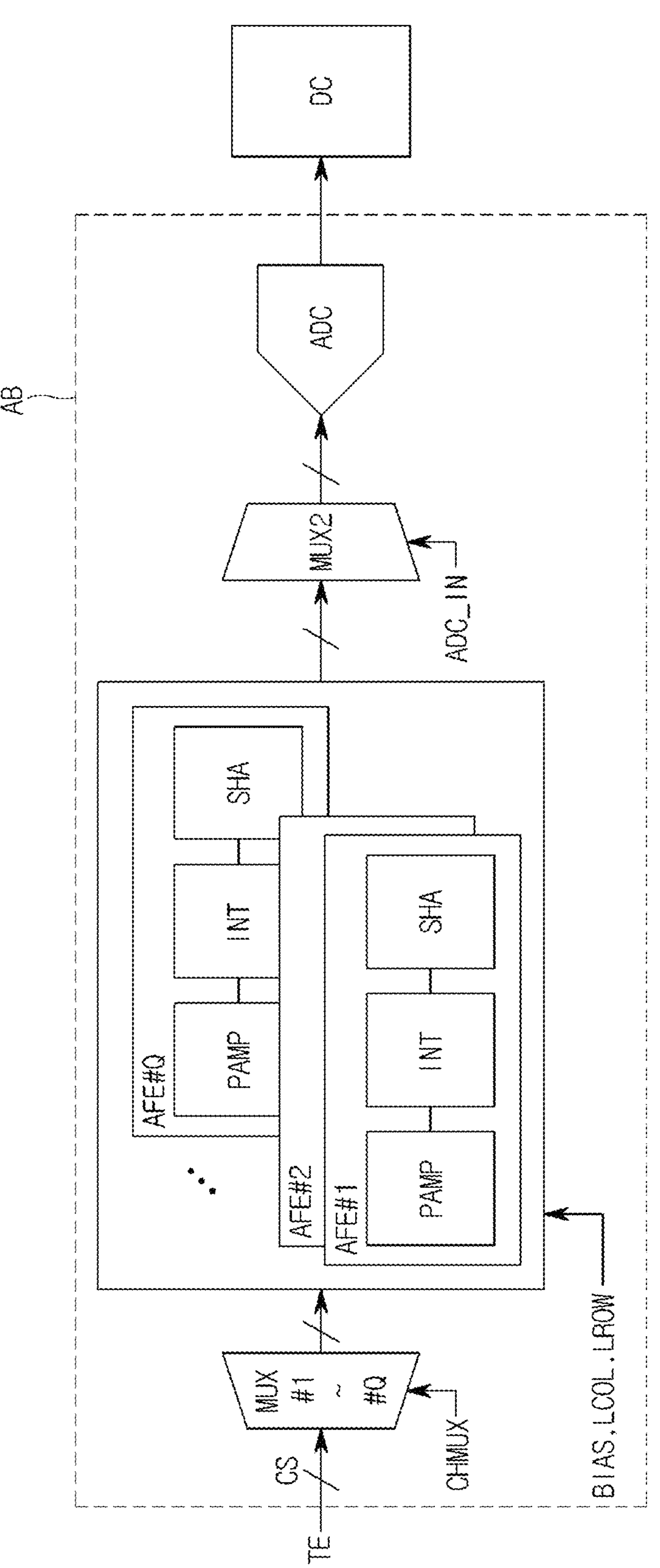
FIG. 5 is a diagram illustrating an example of an analog front end circuit illustrated in FIG. 4 in greater detail.

FIG. 5 is a diagram illustrating an example of the analog front end circuit illustrated in FIG. 4 in greater detail.

Referring to FIG. 5, the first multiplexers MUX #1 to MUX #Q may connect the touch electrodes TE to the analog front-end circuits AFE #1 to AFE #Q sequentially in response to the mux control signals CHMUX which are turned on sequentially.

Each of the analog front-end circuits AFE #1 to AFE #Q may include a pre-amplifier PAMP, an integration circuit INT, and a sampling and hold circuit SHA, etc.

The pre-amplifier PAMP may amplify and output the capacitance signal CS input through the first multiplexer MUX #1 to MUX #Q.

The integration circuit INT may receive a signal output from an output terminal of the pre-amplifier PAMP. The integration circuit INT may integrate a voltage or a current output from the output terminal of the pre-amplifier PAMP a predetermined number of times of integration, and output the integration signal.

The sampling and hold circuit SHA samples the integration signal output from the integration circuit INT and generates a sampling signal, and holds the generated sampling signal. The sampling and hold circuit SHA may be activated in response to the bias signal BIAS and the channel selection signal LCOL and LROW provided through the digital circuit block DB (FIG. 4). The bias signal BIAS and the channel selection signal LCOL and LROW may control turning on or turning off of the transistors configuring the sampling and hold circuit SHA.

The sampling and hold circuit SHA may be activated according to the bias signal BIAS and the channel selection signal LCOL and LROW, and may sample the integration signal. The sampling signal generated through the sampling may be held in the sampling and hold circuit SHA until an ADC input signal ADC_IN which will be described below is applied in a turn-on level.

The second multiplexer MUX2 is connected between the output terminal of the sampling and hold circuit SHA and the input terminal of the analog-to-digital converter ADC. The second multiplexer MUX2 may receive the ADC input signal ADC_IN provided through the digital circuit block DB (FIG. 4).

When the ADC input signal ADC_IN is applied in a turn-on level, the second multiplexer MUX2 may electrically connect the output terminal of the sampling and hold circuit SHA and the input terminal of the analog-to-digital converter ADC. Accordingly, while the ADC input signal ADC_IN is applied in a turn-on level, the sampling signal held in the sampling and hold circuit SHA may be input to the analog-to-digital converter ADC.

When ADC input signal ADC_IN is applied in a turn-off level, the second multiplexer MUX2 electrically disconnect the output terminal of the sampling and hold circuit SHA and the input terminal of the analog-to-digital converter ADC from each other.

The analog-to-digital converter ADC may generate the touch sensing signal by sequentially loading each of the sampling signals held in the sampling and hold circuit SHA, and converting the integration signal into a digital form. The analog-to-digital converter ADC may deliver the touch sensing signal to the digital circuit block DB, for example, the SPI slave (FIG. 4).

Figure 6:
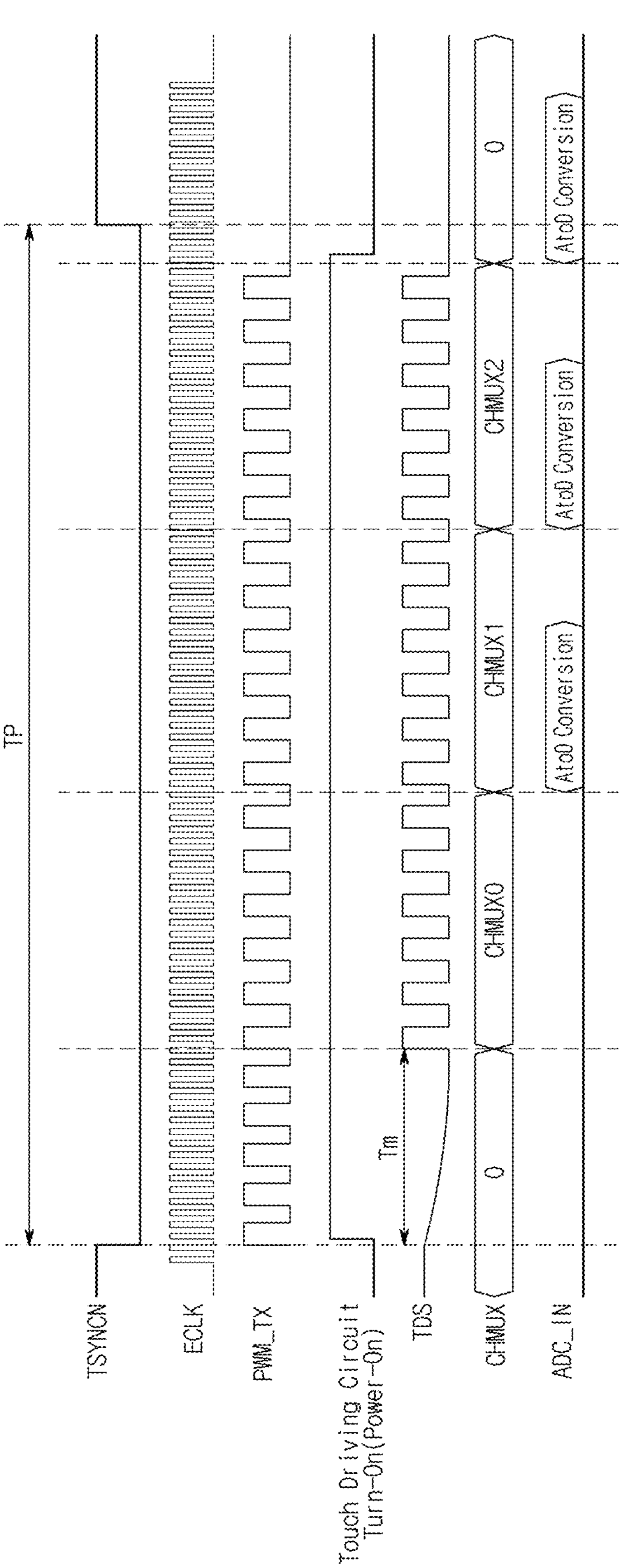
FIG. 6 is a diagram illustrating input/output signals of an input sensing device illustrated in FIG. 4.

FIG. 6 is a diagram illustrating input/output signals of the input sensing device illustrated in FIG. 4.

Referring to FIGS. 4 and 6 together, in the touch driving period TP, the touch synchronization signal TSYNC may be applied in the second level, for example, the low level. In a period in which the touch synchronization signal TSYNC is in a high level, the first clock signal ECLK may not be output. When the touch synchronization signal TSYNC is transitioned to a low level, the first clock signal ECLK in a pulse form may be output. In a period in which the input sensing device does not substantially perform the sensing operation, an operation of the input sensing device with a low power consumption may become possible by reducing power consumed for generating the first clock signal ECLK.

In an implementation, the first clock signal ECLK may be output earlier by as much as a predetermined time than a time point when the touch synchronization signal TSYNC is transitioned. Through this configuration, the first clock signal ECLK may be stabilized before the touch driving period starts.

The touch driving circuit 20 starts the operation for the touch sensing in response to the touch synchronization signal TSYNC in a low level and the first clock signal ECLK. For example, in response to the touch synchronization signal TSYNC and the first clock signal ECLK, the digital circuit block DB may activate a driving signal for driving (activating) the analog circuit block AB, for example, the bias signal BIAS and the channel selection signal LCOL and LROW, to get into a turn-on level (for example, a high level). The analog circuit block AB may be turned on (power-on) according to the activated bias signal BIAS and the channel selection signal LCOL and LROW, and may get into a state in which a driving preparation is finished for the touch sensing.

When the touch driving circuit 20 is turned on, the touch control unit 30 may output the pulse width modulation signal PWM_TX. The touch driving circuit 20 may generate the touch driving signal TDS based on the pulse width modulation signal PWM_TX, and may apply the signal TDS to the touch electrodes TE. In this scenario, there may be a particular time margin Tm for the touch driving signal TDS to be stabilized after transitioning from the common voltage Vcom output in the display driving period.

After this time margin Tm (e.g., after the touch driving signal TDS is stabilized), when the mux control signal CHMUX is applied sequentially in a turn-on level, the capacitance signal output from the touch electrodes TE in response to the touch driving signal TDS may be input to the analog circuit block AB. The analog circuit block AB may sample the capacitance signal sequentially in response to the ADC input signal ADC_IN, generate the touch sensing signal, and may apply the touch sensing signal to the touch control unit 30.

After the sensing with respect to the touch electrodes TE is finished, when the touch synchronization signal TSYNC is transitioned to a high level, the output of the first clock signal ECLK may stop. In addition, in response to the touch synchronization signal TSYNC in a high level, the touch driving circuit 20 may inactivate (transition into a low level) the bias signal BIAS and the channel selection signal LCOL and LROW sequentially, may be turned off and may get into a power saving state.

As described above, in a low power design which reduces power consumption as the analog circuit block AB is controlled in a turn-off state (a power saving mode, a low power mode) in the non-touch sensing period, that is, the display driving period DP, even if the touch driving period starts according to the touch synchronization signal TSYNC, the actual touch sensing may be performed by using the touch driving signal TDS which is stabilized after the predetermined time margin TM. At this instance, the analog circuit block AB of the touch driving circuit 20 is turned on along with the transition of the touch synchronization signal TSYNC, and thus, unnecessary power consumption may occur while the touch driving signal TDS is stabilized.

Figure 7:
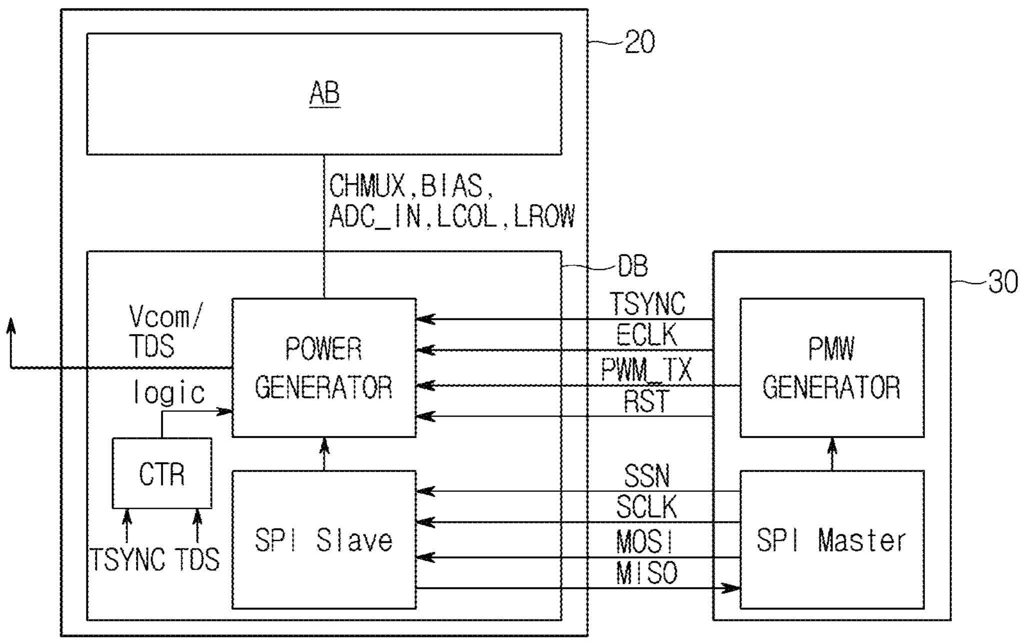
FIG. 7 is a diagram illustrating a configuration of a touch driving circuit and a touch control unit according to an implementation.

FIG. 7 is a diagram illustrating an example configuration of the touch driving circuit and the touch control unit according to an implementation. With respect to the touch driving circuit 20 and the touch control unit 30 illustrated in FIG. 7, the components redundant with those of FIG. 4 are provided with the same reference numerals, and the detailed description thereof will be omitted.

Referring to FIG. 7, the digital circuit block DB of the touch driving circuit 20 according to an implementation may include the power generator and the SPI slave. In addition, the digital circuit block DB of the touch driving circuit 20 may further include a counter CTR. The counter CTR may be included in the touch driving circuit 20, or may be provided as an independent component from the touch driving circuit 20.

The counter CTR may start a predetermined count in response to the touch synchronization signal TSYNC. For example, the counter CTR may perform the count while the touch synchronization signal TSYNC is in a low level.

In an implementation, the counter CTR may perform the count using a predetermined clock signal. For example, the counter CTR may count a quantity of the first clock signal ECLK, the second clock signal SCLK applied from the touch control unit 30, or the clock signal generated inside.

The counter CTR may store a count value (e.g., predetermined count value) in a register in advance. The count value may be set based on a time margin Tm (FIG. 6). For example, this time margin Tm may correspond to an amount of time for the touch driving signal TDS to be stabilized. In some examples, the count value may correspond to a quantity of the pulse of the clock signal which corresponds to the time margin Tm.

For example, consider a case in which a time margin is about 20 us for the touch driving signal TDS to be stabilized after the touch synchronization signal TSYNC is transitioned to a low level, and one cycle of the clock signal which is counted is about 0.1 us. In this case, the count value may be set as about 200.

In an implementation, the counter CTR may directly set the count value. In such an implementation, the counter CTR may count until the touch driving signal TDS is stabilized since the power generator generates the touch driving signal TDS in response to the touch synchronization signal TSYNC, and may store the count value in the register. The counter CTR may determine the stabilization of the touch driving signal TDS by detecting a rising edge and/or a falling edge of the touch driving signal TDS. That is, the counter CTR may start count in response to transition of the touch synchronization signal TSYNC into a low level, may end count when the rising edge (or the falling edge) of the touch driving signal TDS output from the power generator is detected, and may store the stored count value in the register.

In an implementation, the counter CTR may update the count value stored in the register by performing an operation for determining the count value as described above in each frame. While the display device 1 is driven, the counter CTR may reset the count value in real-time by reflecting a stabilization time of the touch driving signal TDS which is changed. Accordingly, the touch driving circuit 20 may actively cope with the change of the stabilization time of the touch driving signal TDS.

The counter CTR may end count when the count value reaches a prestored (or preset) count value as above. In addition, the counter CTR may apply a predetermined logic signal to the power generator. For example, when the count value is not the same as the count value stored in the register, the counter CTR may output a logic signal in the second level, for example, a low level, and when the count value is the same as the stored count value, the counter CTR may output a logic signal in the first level, for example, a high level.

The power generator may start an operation for driving the touch sensing based on a count value obtained through the counter CTR. When the logic signal in a high level is input from the counter CTR, the power generator may wake up the analog circuit block AB, e.g., by activating a corresponding driving signal (for example, analog power signals). Here, the driving signal may be the bias signal BIAS and the channel selection signal LCOL and LROW, but is not limited thereto.

The analog circuit block AB may be woken up (e.g., turned on) according to the activated bias signal BIAS and the channel selection signal LCOL and LROW and may perform a driving preparation for the touch sensing.

Figure 8:
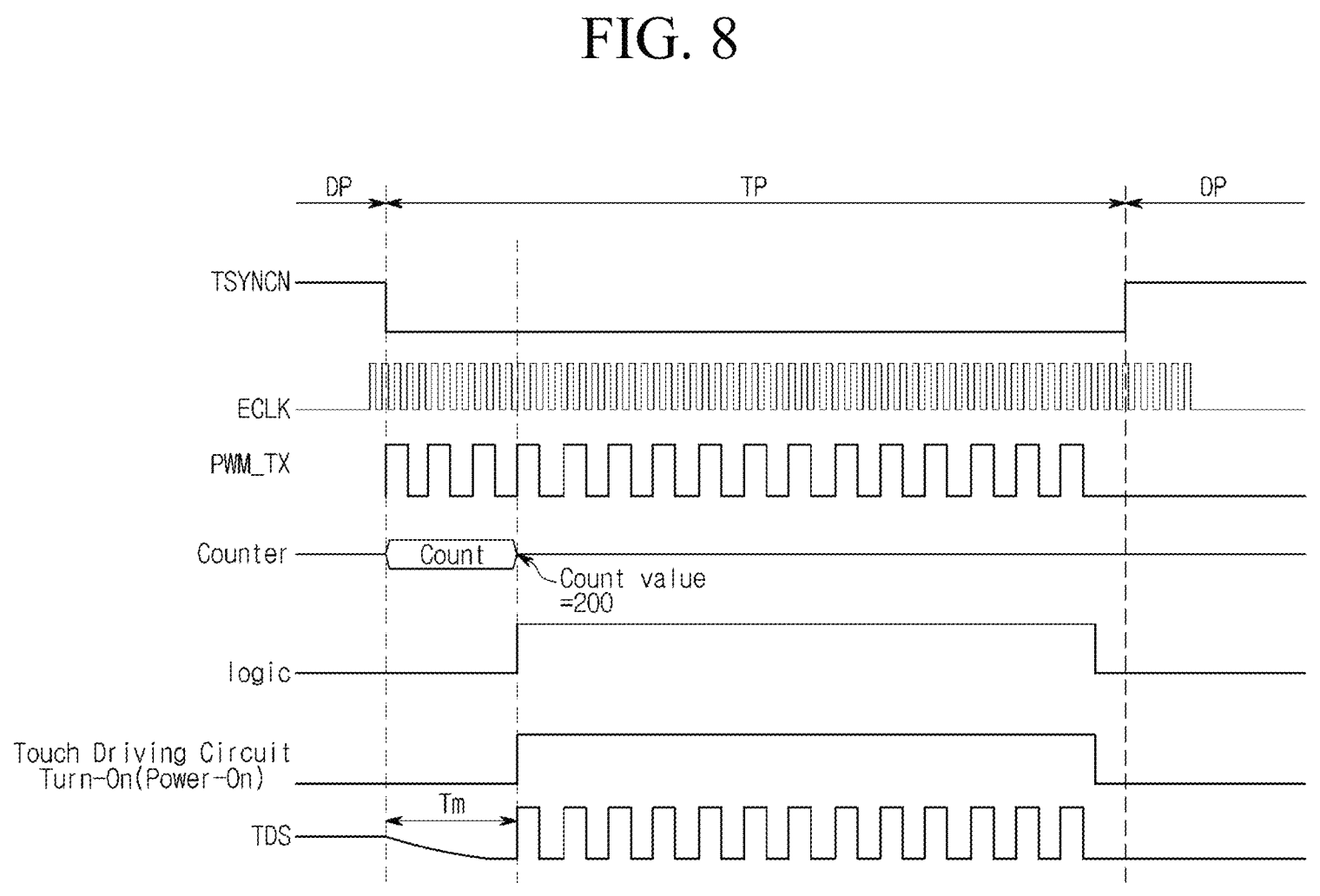

FIG. 8 is a diagram illustrating example input/output signals of the input sensing device illustrated in FIG. 7.

Referring to FIGS. 7 and 8 together, in the display driving period DP, the touch synchronization signal TSYNC may be applied in the first level, for example, a high level.

When the touch driving period TP starts, the touch synchronization signal TSYNC may be transitioned to the second level, for example, a low level. In addition, the first clock signal ECLK and the pulse width modulation signal PWM_TX may be applied from the touch control unit 30 to the digital circuit block DB of the touch driving circuit 20.

The power generator may generate the touch driving signal TDS based on the pulse width modulation signal PWM_TX. At this instance, there may be a particular time margin Tm for the touch driving signal TDS to be stabilized after transitioning from the common voltage Vcom output in the display driving period.

The counter CTR may include a count value prestored in the register. For example, in the illustrated implementation, the prestored count value is 200.

The counter CTR may count in response to the touch synchronization signal TSYNC in a low level. The counter CTR may count a quantity of a pulse of the first clock signal ECLK, the second clock signal SCLK applied from the touch control unit 30, or an additional clock signal generated inside.

When the count value becomes the same as the count value prestored in the register, the counter CTR may transition the logic signal to the first level, for example, a high level. Here, the prestored count value can be determined based on the time margin Tm (e.g., which may be a time duration for the touch driving signal TDS to be stabilized). In such scenarios, the counter CTR counts during the time margin Tm while the touch driving signal TDS is stabilized, and a time point when the count ends may correspond to a time after the touch driving signal TDS is stabilized.

The power generator may activate (turn on) the analog circuit block AB in response to the logic signal in a high level. For example, the power generator may activate driving signals for turning on the analog circuit block AB, for example, the bias signal BIAS and the channel selection signal LCOL and LROW.

The analog circuit block AB may be turned on in response to the driving signal applied from the power generator of the digital circuit block DB. The analog circuit block AB may receive the stabilized touch driving signal TDS from the power generator, deliver the touch driving signal TDS to the touch electrodes TE (FIG. 4), and may perform the touch sensing based on the touch sensing signal received from the touch electrode TE.

In such an implementation, the analog circuit block AB may maintain a turn-off state even after the touch driving period TP is started, e.g., to provide time for the touch driving signal TDS to stabilize, after which the analog circuit block AB can be turned on (e.g., after the touch driving signal TDS is stabilized), and proceed to perform the sensing operation. As such, the actual touch sensing can be performed using the stabilized touch driving signal TDS, at which time the analog circuit block AB is turned on, thereby reducing unnecessary power consumption and also improving the touch sensing accuracy.

Figure 9:
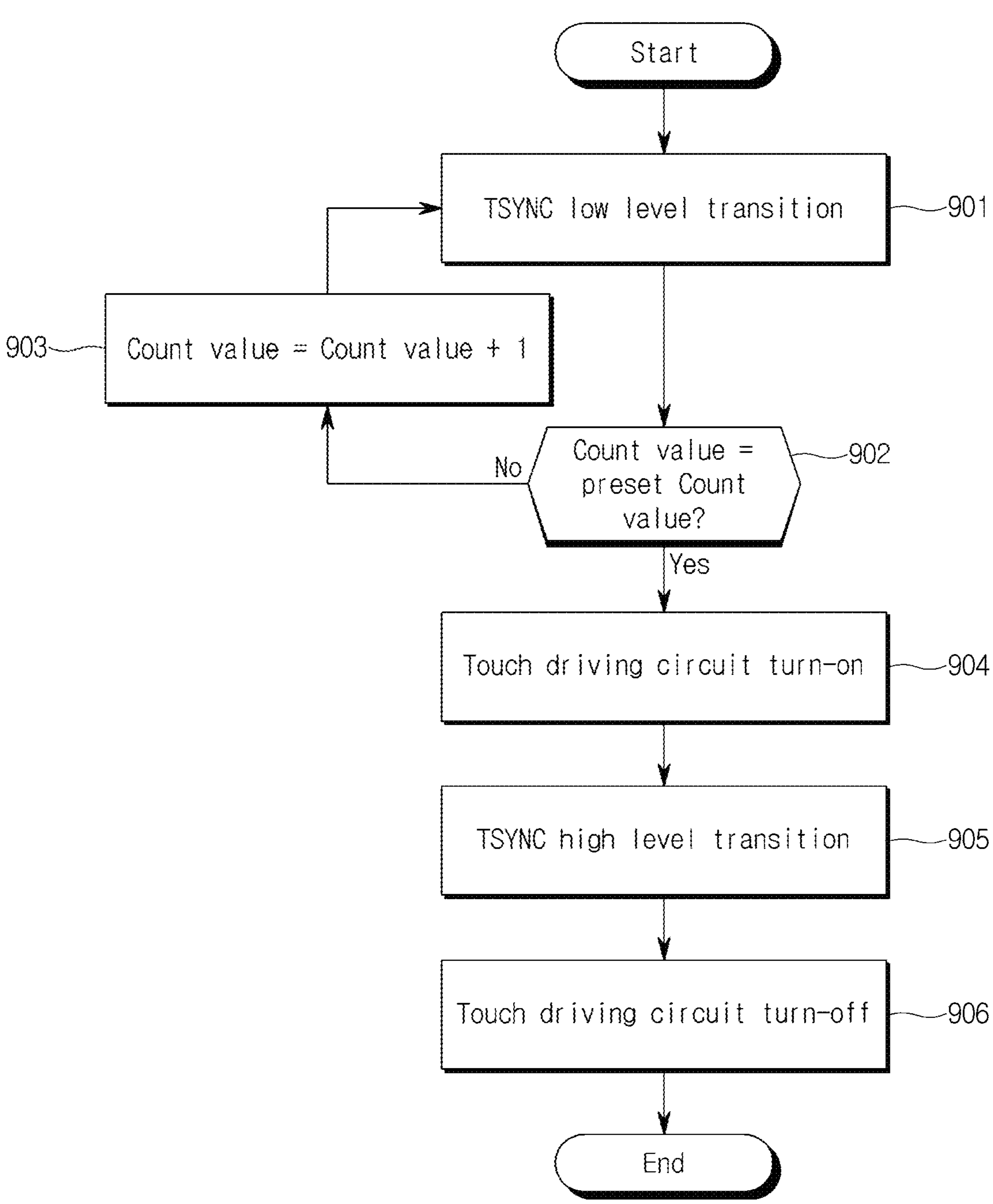
FIG. 9 is a flowchart for describing a method for sensing a touch according to an implementation.

FIG. 9 is a flowchart for describing a method for sensing a touch according to an implementation.

Referring to FIG. 9, the input sensing device according to an implementation may start the touch driving period (901) by transitioning the touch synchronization signal TSYNC into a low level. Accordingly, when the falling edge of the touch synchronization signal TSYNC is generated, the input sensing device may perform count. In more detail, the input sensing device may determine whether the count value reaches a preset count value (902), and if the count value does not reach the preset count value, the input sensing device may increase the count value by 1 (903).

When the count value reaches a preset count value (902), the input sensing device may turn on the touch driving circuit, for example, the analog circuit block (904). In addition, the input sensing device may initialize the count value.

The input sensing device may end the touch driving period by transitioning the touch synchronization signal TSYNC to a high level after performing the touch sensing through the analog circuit block which is turned on (905). Accordingly, when the rising edge of the touch synchronization signal TSYNC occurs, the touch driving circuit, for example, the analog circuit block may be turned off, and may be driven in the low power mode (906).

Figure 10:
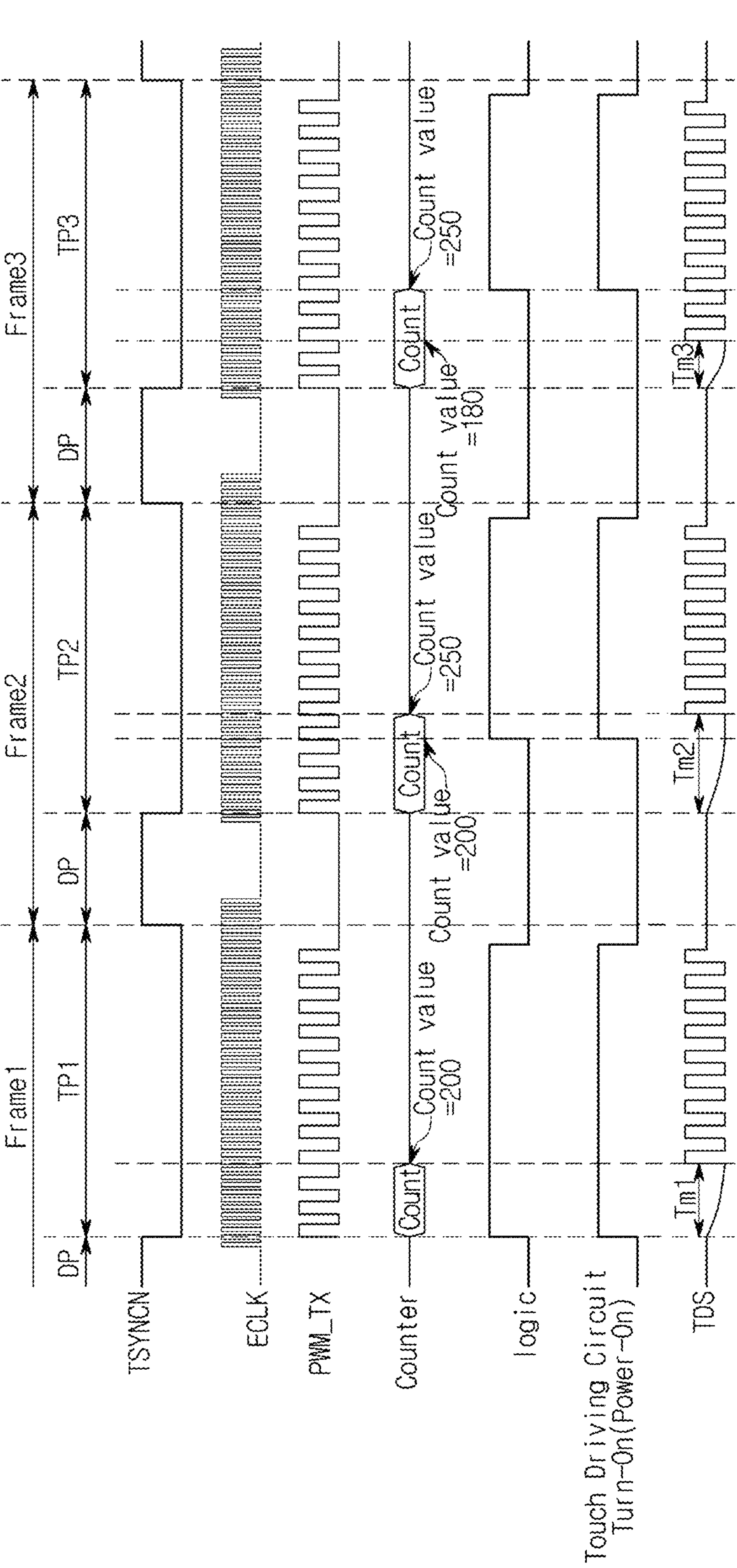
FIG. 10 is a diagram illustrating input/output signals of an input sensing device illustrated in FIG. 7 according to another implementation.

FIG. 10 is a diagram illustrating input/output signals of an input sensing device illustrated in FIG. 7 according to another implementation.

Referring to FIGS. 7 and 10 together, after the display device 1 is powered on, in the display driving period DP of the first frame Frame1 (e.g., an initial frame after power-on), the touch synchronization signal TSYNC may be applied in the first level, for example, a high level.

When the display driving period DP of the first frame Frame1 is started, the touch synchronization signal TSYNC may be transitioned to the second level, for example, a low level. In addition, the first clock signal ECLK and the pulse width modulation signal PWM_TX may be applied to the digital circuit block DB of the touch driving circuit 20 from the touch control unit 30.

The power generator starts driving for the touch sensing in response to the touch synchronization signal TSYNC in a low level and the first clock signal ECLK. For example, the digital circuit block DB may activate a driving signal for driving (activating) the analog circuit block AB in response to the first clock signal ECLK and the touch synchronization signal TSYNC.

In addition, the power generator may generate the touch driving signal TDS based on the pulse width modulation signal PWM_TX. At this scenario, there may be a first time margin Tm1 for the touch driving signal TDS to be stabilized after transitioning from the common voltage Vcom output in the display driving period.

The activated analog circuit block AB may perform touch sensing using the touch driving signal TDS.

During the first frame Frame1, the counter CTR may count the first time margin Tm1 (e.g., until the touch driving signal TDS is substantially stabilized) in a first touch driving period TP1. The counter CTR may store a count value in the register when the rising edge or the falling edge of the touch synchronization signal TDS is detected. In the illustrated implementation, the count value may be 200.

After the first touch driving period TP1, the analog circuit block AB may be turned off and may be operated in a low power mode. In addition, in the display driving period DP of a second frame Frame2, the touch synchronization signal TSYNC may be applied in the first level, for example, a high level.

When a second touch driving period TP2 of the second frame Frame2 is started, the touch synchronization signal TSYNC may be transitioned to the second level, for example, a low level. In addition, the first clock signal ECLK and the pulse width modulation signal PWM_TX may be applied to the digital circuit block DB of the touch driving circuit 20 from the touch control unit 30.

The power generator may generate the touch driving signal TDS based on the pulse width modulation signal PWM_TX. At this scenario, there may be a second time margin Tm2 for the touch driving signal TDS to be stabilized after transitioning from the common voltage Vcom output in the display driving period. Here, the second time margin Tm2 may be the same as or different from the first time margin Tm1.

The counter CTR may count in response to the touch synchronization signal TSYNC in a low level. The counter CTR may count a quantity of a pulse of the first clock signal ECLK, the second clock signal SCLK applied from the touch control unit 30, or an additional clock signal generated inside.

In the register, the counter CTR may include the count value stored in the previous frame, for example, 200. The counter CTR may count in response to the touch synchronization signal TSYNC in a low level. The counter CTR may count a quantity of a pulse of the first clock signal ECLK, the second clock signal SCLK applied from the touch control unit 30, or an additional clock signal generated inside.

When the count value reaches the count value prestored in the register, the counter CTR may transition the logic signal to the first level, for example, a high level. Here, the prestored count value can be determined based on the actual time margin Tm1 for the touch driving signal TDS to be stabilized, therefore, the counter CTR counts while the touch driving signal TDS is stabilized, and a time point when the count ends may correspond to a time after the touch driving signal TDS is generally stabilized.

In addition, the counter CTR may count the second time margin Tm2 for the touch driving signal TDS to be substantially stabilized in the second touch driving period TP2. In addition, in some scenarios, the counter CRT may update the prestored count value with a newly counted value. In the illustrated implementation, the second time margin Tm2 may be longer than the first time margin Tm1, and the count value may be, for example, 250. However, implementations are not limited thereto. The counter CTR may temporarily store a new count value in the register, and may update the count value stored in the register with a newly counted value after the logic signal is transitioned to a high level.

The power generator may activate (turn on) the analog circuit block AB in response to the logic signal in a high level. The analog circuit block AB may be turned on in response to the driving signal applied from the power generator of the digital circuit block DB. The analog circuit block AB may receive the stabilized touch driving signal TDS from the power generator, deliver the touch driving signal TDS to the touch electrodes TE (FIG. 4), and may perform the touch sensing based on the touch sensing signal received from the touch electrode TE.

After the second touch driving period TP2, the analog circuit block AB may be turned off, and may be driven in the low power mode. In addition, in the display driving period DP of a third frame Frame3, the touch synchronization signal TSYNC may be applied in the first level, for example, a high level.

When a third touch driving period TP3 of the third frame Frame3 is started, the touch synchronization signal TSYNC may be transitioned to the second level, for example, a low level. In addition, the first clock signal ECLK and the pulse width modulation signal PWM_TX may be applied to the digital circuit block DB of the touch driving circuit 20 from the touch control unit 30.

The power generator may generate the touch driving signal TDS based on the pulse width modulation signal PWM_TX. At this instance, there may be a third time margin Tm3 for the touch driving signal TDS to be stabilized after transitioning from the common voltage Vcom output in the display driving period. Here, the third time margin Tm3 may be the same as or different from the first time margin Tm1 or the second time margin Tm2.

In the register, the counter CTR may include the count value stored in the previous frame, for example, 250. The counter CTR may count in response to the touch synchronization signal TSYNC in a low level. When the count value reaches the count value prestored in the register, the counter CTR may transition the logic signal to the first level, for example, a high level.

In addition, the counter CTR may count the third time margin Tm3 for the touch driving signal TDS to be substantially stabilized in the third touch driving period TP3. In addition, in some scenarios, the counter CRT may update the prestored count value with a newly counted value. In the illustrated implementation, the third time margin Tm3 may be shorter than the second time margin Tm2, and the count value may be, for example, 180. However, implementations are not limited thereto. The counter CTR may temporarily store a new count value in the register, and may update the count value stored in the register with a newly counted value after the logic signal is transitioned to a high level.

The power generator may activate (turn on) the analog circuit block AB in response to the logic signal in a high level. The analog circuit block AB may be turned on in response to the driving signal applied from the power generator of the digital circuit block DB. The analog circuit block AB may receive the stabilized touch driving signal TDS from the power generator, deliver the touch driving signal TDS to the touch electrodes TE (FIG. 4), and may perform the touch sensing based on the touch sensing signal received from the touch electrode TE.

In such an implementation, while the display device 1 is driven, the counter CTR may detect a stabilization time of the touch driving signal TDS which may be changed in real-time, and may reset the count value accordingly. Therefore, the touch driving circuit 20 may actively cope with changes of the touch driving signal TDS generated in real-time according to an operation environment of the display device 1.

Figure 11:
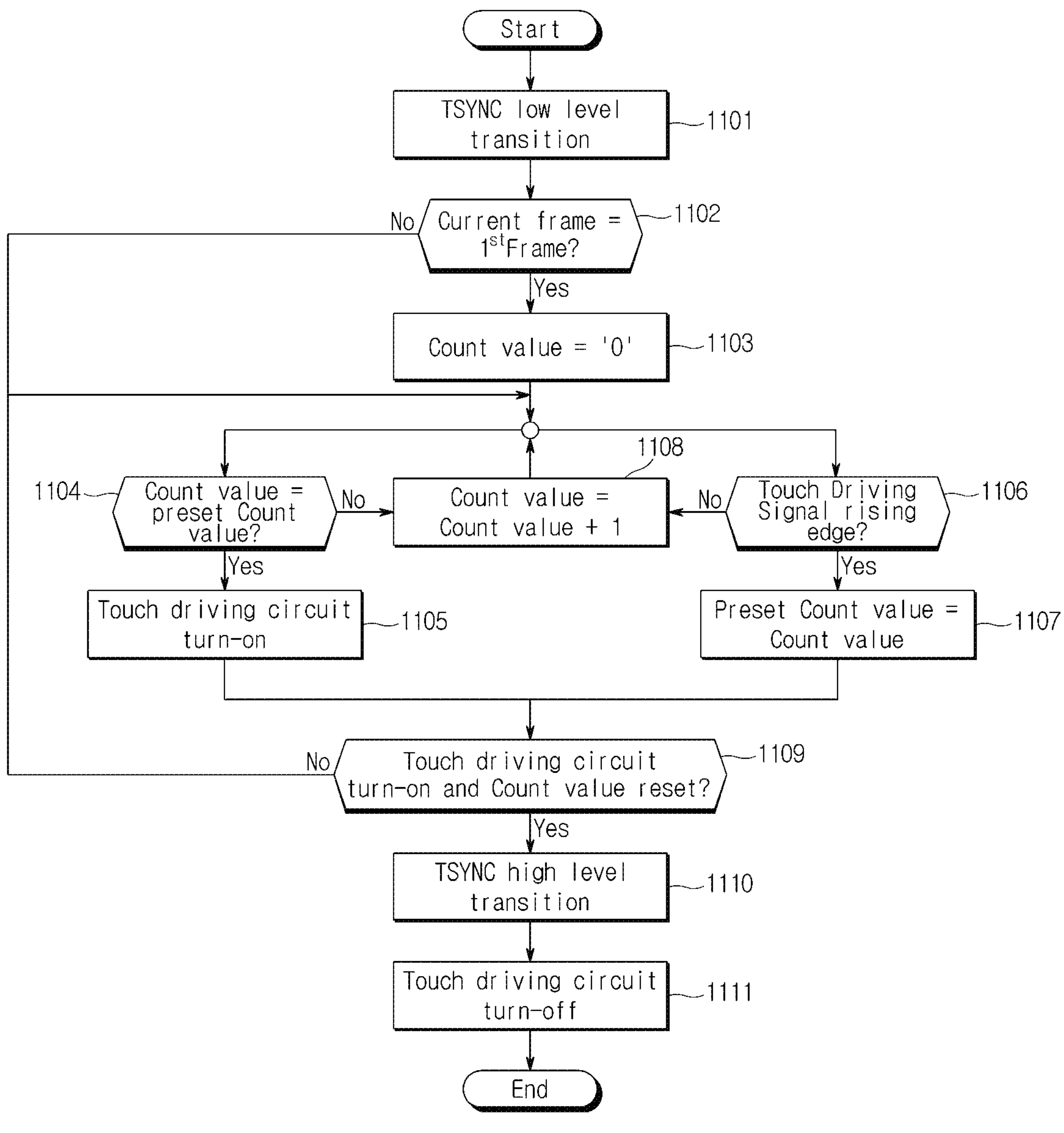
FIG. 11 is a flowchart for describing a method for sensing a touch according to another implementation.

FIG. 11 is a flowchart for describing an example method for sensing a touch according to another implementation.

Referring to FIG. 11, the input sensing device according to an implementation may start the touch driving period by transitioning the touch synchronization signal TSYNC to a low level (1101). Accordingly, when the falling edge of the touch synchronization signal TSYNC occurs, the input sensing device may determine whether the current frame is the first frame (initial frame) since the power-on (1102). The input sensing device determine whether the current frame is the first frame (initial frame) based on a control signal input from the timing controller, or the external host, etc.

When the current frame is the first frame (1102), the input sensing device may set the count value as an initial value, for example, '0' (1103). When the current frame is not the first frame (1102), an operation of setting the count value as the initial value, '0', is skipped.

Thereafter, the input sensing device may count. In more detail, the input sensing device may determine whether the count value reaches the preset count value (1104), and if the count value does not reach the preset count value, the input sensing device may increase the count value by 1 (1108).

As the count value set in the first frame is '0', in the first frame, the count value reaches the preset count value immediately, and then, the next operation may be performed.

In a frame which is not the first frame, the preset count value may not be '0', and may be a value set based on an actual stabilization period of the touch driving signal in a previous frame. The input sensing device may increase the count value until the count value reaches the count value preset in the previous frame.

When the count value reaches the preset count value (1104), the input sensing device may turn on the touch driving circuit, for example, the analog circuit block (1105).

Meanwhile, in some scenarios, while the count is performed, the input sensing device may perform an operation of resetting the count value. In more detail, the input sensing device may determine whether the touch driving signal is stabilized. For example, the input sensing device may determine whether the rising edge (or the falling edge) of the touch driving signal is generated (1106). When the rising edge of the touch driving signal is not generated, the input sensing device may increase the count value by 1 (1108). When the rising edge of the touch driving signal is generated, the input sensing device may reset the current count value to a new count value (1107).

When the turning on of the analog circuit block and resetting of the count value are both completed (1109), the input sensing device may perform the touch sensing through the analog circuit block which is turned on, and then, may end the touch driving period by transitioning the touch synchronization signal TSYNC to a high level (1110). Accordingly, when the rising edge of the touch synchronization TSYNC is generated, the touch driving circuit, for example, the analog circuit block may be turned off to be driven in the low power mode (1111).

The implementations of the present disclosure have been described with reference to accompanying drawings. Implementations of the present disclosure may be embodied in various forms without departing from its spirit or essential characteristics. The described implementations are to be considered in all respects only as illustrative and not restrictive. The scope of the present disclosure is therefore indicated by the appended claims rather than by the foregoing description. All changes which come within meaning and range of equivalency of the claims are to be embraced within the scope of the present disclosure.

What is claimed is:

1. An input sensing device, comprising:
- a touch panel including touch electrodes;
- a sensing circuit configured to operate in a low power mode in a display driving period in one frame, and sense a touch input based on a touch sensing signal output from the touch electrodes in response to a touch driving signal in a touch driving period in the one frame;
- a power generator configured to generate the touch driving signal in the touch driving period; and
- a touch control circuit configured to control an operation timing of the sensing circuit and the power generator,
- wherein in the touch driving period, the sensing circuit is operated in the low power mode during a predetermined time margin for the touch driving signal to stabilize, and is woken up by receiving a power signal after the predetermined time margin.

2. The input sensing device of claim 1,
- wherein the touch control circuit is configured to output a touch synchronization signal at a first level in the display driving period, and to output the touch synchronization signal at a second level in the touch driving period,
- wherein the power generator is configured to generate the touch driving signal in response to the touch synchronization signal at the second level, and
- wherein the sensing circuit is woken up after the time margin from when the touch synchronization signal is transitioned to the second level.

3. The input sensing device of claim 2, further comprising:
- a counter configured to perform a counting operation in response to the touch synchronization signal at the second level, and output a logic signal having a predetermined level based on a count value reaching a preset count value, wherein the power generator generates the power signal in response to the logic signal, and wherein the sensing circuit is woken up in response to the power signal.

4. The input sensing device of claim 3, wherein the counter is configured to count a quantity of pulses of a clock signal.

5. The input sensing device of claim 3, wherein the preset count value is set in correspondence with the time margin.

6. The input sensing device of claim 5, wherein the counter is configured to perform the counting operation during the time margin, and based on a determination that the touch driving signal is stabilized, to reset the count value as the preset count value.

7. The input sensing device of claim 6, wherein the counter is configured to determine that the touch synchronization signal is stabilized when a rising edge or a falling edge of the touch driving signal is detected.

8. The input sensing device of claim 3, further comprising:

an analog circuit block including the sensing circuit and configured to generate the touch sensing signal by converting a capacitance signal output from the touch electrodes into a digital signal; and a digital circuit block including the counter and configured to transmit the touch sensing signal to the touch control circuit.

9. A method for operating an input sensing device comprising: a touch panel including touch electrodes; a sensing circuit configured to operate in a low power mode in a display driving period in one frame and sense a touch input based on a touch sensing signal output from the touch electrodes in response to a touch driving signal in a touch driving period in the one frame; a power generator configured to generate the touch driving signal in the touch driving period; a touch control circuit configured to control an operation timing of the sensing circuit and the power generator; and a counter, the method comprising:

driving, by the touch control circuit, the sensing circuit in the low power mode;

outputting, by the touch control circuit, a touch synchronization signal at a first level in the display driving period;

transitioning, by the touch control circuit, the touch synchronization signal to a second level in the touch driving period;

performing, by the counter, a counting operation in response to the transition of the touch synchronization signal; and waking up, by the counter, the sensing circuit by applying a power signal to the sensing circuit based on a count value reaching a preset count value.

10. The method for operating an input sensing device of claim 9, wherein the preset count value is set based on a predetermined time margin for the touch driving signal to be stabilized.

11. The method for operating an input sensing device of claim 9, further comprising:

after the transitioning, setting the preset count value as 0 based on a current frame being an initial frame after the transitioning.

12. The method for operating an input sensing device of claim 9, further comprising:

after the transitioning, generating, by the power generator, the touch driving signal in response to the transition of the touch synchronization signal;

performing, by the counter, the counting operation during a time margin in which the touch driving signal is stabilized; and resetting, by the counter, the count value as the preset count value based on a determination that the touch driving signal is stabilized.

13. The method for operating an input sensing device of claim 12, wherein the resetting includes:

determining that the touch synchronization signal is stabilized based on a rising edge or a falling edge of the touch driving signal being detected.

* * * * *